(12) United States Patent
Hiraoka

(10) Patent No.: US 11,604,173 B2
(45) Date of Patent: Mar. 14, 2023

(54) DEVICE STORAGE STRUCTURE FOR FLUID CHROMATOGRAPH

(71) Applicant: SHIMADZU CORPORATION, Kyoto (JP)

(72) Inventor: Tomoki Hiraoka, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 207 days.

(21) Appl. No.: 17/054,831

(22) PCT Filed: Jan. 17, 2019

(86) PCT No.: PCT/JP2019/001350
§ 371 (c)(1),
(2) Date: Nov. 12, 2020

(87) PCT Pub. No.: WO2019/220684
PCT Pub. Date: Nov. 21, 2019

(65) Prior Publication Data
US 2021/0215649 A1    Jul. 15, 2021

(30) Foreign Application Priority Data

May 16, 2018 (JP) .............................. JP2018-094850
Jun. 8, 2018 (JP) .............................. JP2018-110593
Jun. 8, 2018 (JP) .............................. JP2018-110594

(51) Int. Cl.
*B01D 15/14* (2006.01)
*G01N 30/60* (2006.01)
(Continued)

(52) U.S. Cl.
CPC ......... *G01N 30/6047* (2013.01); *B01D 15/14* (2013.01); *G01N 30/30* (2013.01);
(Continued)

(58) Field of Classification Search
CPC .... G01N 30/6047; G01N 30/30; G01N 30/32; G01N 2030/326; B01D 15/14; B01D 15/40
See application file for complete search history.

(56) References Cited

U.S. PATENT DOCUMENTS 6,297,950 B1 * 10/2001 Erwin .................... B01D 46/10
361/688
2002/0097560 A1 * 7/2002 Carr ........................ G06F 1/181
361/679.02
(Continued)

FOREIGN PATENT DOCUMENTS

| CN | 2762647 Y | 3/2006 |
| WO | 2014/034336 A1 | 3/2014 |
| WO | 2017/122259 A1 | 6/2017 |

OTHER PUBLICATIONS

International Search Report for corresponding Application No. PCT/JP2019/001350, dated Apr. 16, 2019.
(Continued)

*Primary Examiner* — Benjamin L Lebron
(74) *Attorney, Agent, or Firm* — Renner, Otto, Boisselle & Sklar, LLP

(57) ABSTRACT

A storage container includes a casing and a bi-parting door. The casing has an opening and stores a device to be used in a fluid chromatograph. A door of the bi-parting door includes a frame member and a cover member. The frame member includes an upper frame and a lower frame. The upper frame and the lower frame are provided at the casing to be turnable around a turning axis and be spaced apart from each other on the turning axis. The cover member is configured to be attachable to and detachable from the frame member and partially cover the opening when the door is closed. A space is formed between the upper frame and the lower frame.

9 Claims, 11 Drawing Sheets

(51) Int. Cl.
     *G01N 30/32*      (2006.01)
     *G01N 30/30*      (2006.01)
     *B01D 15/40*      (2006.01)

(52) U.S. Cl.
     CPC ............ *G01N 30/32* (2013.01); *B01D 15/40* (2013.01); *G01N 2030/326* (2013.01)

(56) References Cited

U.S. PATENT DOCUMENTS

2007/0138174 A1*   6/2007   Jaeb .................. E05C 19/06
2016/0207468 A1*   7/2016   Fesenmyer ............ B60N 2/773

OTHER PUBLICATIONS

Written Opinion for corresponding Application No. PCT/JP2019/001350, dated Apr. 16, 2019 (partial English translation).
Office Action in corresponding Chinese Patent Application No. 201980031881.4 dated May 9, 2022, with English machine translation.

\* cited by examiner

DEVICE STORAGE STRUCTURE FOR FLUID CHROMATOGRAPH

TECHNICAL FIELD

The present invention relates to a device storage structure for a fluid chromatograph that stores a device to be maintained.

BACKGROUND ART

In a fluid chromatograph such as a liquid chromatograph and a supercritical fluid chromatograph, a supply device for supplying a mobile phase to a column is used. As such a supply device, a liquid sending device to be used in a liquid chromatograph is described in Patent Document 1, for example.

The liquid sending device includes a casing and two plunger pumps. Each of the two plunger pumps has a pump head and a pump body, and the pump head is stored in the casing to be directed toward the front surface of the casing. An open-close cover is provided in a front portion of the casing to be openable and closable or to be attachable and detachable such that a pump head storage inside of the casing can be opened and closed. Thus, a user can access the pump head of each plunger pump from the outside of the casing with the open-close cover opened or with the open-close cover detached. Thus, each plunger pump is maintained by replacement of a component or the like.

[Patent Document 1] WO 2017-122259 A1

SUMMARY OF INVENTION

Technical Problem

In a case where the open-close cover is provided at the casing as a closable-openable door in the above-mentioned liquid sending device, the user maintains each plunger pump with the door opened. At this time, in a case where the pump head is located in the vicinity of a turning axis of the door, a work space for maintenance is restricted by the door. Thus, workability for maintenance is reduced.

During the above-mentioned maintenance, a work space is desirably ensured to the extent that a tool to be used for maintenance does not interfere with the door. In order to sufficiently ensure the work space for maintaining the pump head, it is necessary to arrange the pump head at a position largely spaced apart from the turning axis of the door in the casing. In this case, flexibility in layout of the plunger pump is restricted, and the size of the casing is increased.

An object of the present invention is to provide a device storage structure for a fluid chromatograph that improves flexibility in layout of a device to be maintained in a casing and can suppress a reduction in workability for maintaining the device and an increase in size of the casing.

Solution to Problem (1) A device storage structure for a fluid chromatograph according to one aspect of the present invention includes a casing that has an opening and stores a device to be maintained and a door provided at the casing to close and open at least a partial area of the opening, wherein the door includes first and second frames that are turnable around a turning axis and spaced apart from each other on the turning axis, and a cover member that is attachable to and detachable from the first and second frames and covers the at least a partial area when the door is closed, and a space is formed between the first frame and the second frame.

With this device storage structure for a fluid chromatograph, the user can maintain the device in the casing through at least part of the opening by opening the door. Further, the user can detach the cover member from the first and second frames when maintaining the device. A space is formed between the first and second frames. Thus, the space formed between the first and second frames can be utilized as a work space for maintaining the device. Therefore, even in a case where the device is arranged in the vicinity of the turning axis of the door in the inner space of the casing, a reduction in workability for maintaining the device is suppressed.

As a result, flexibility in layout of the device to be maintained in the casing is improved, and a reduction in workability for maintaining the device and an increase in size of the casing can be suppressed.

(2) The door may further include a frame coupler that couples a portion of the first frame spaced apart from the turning axis to a portion of the second frame spaced apart from the turning axis.

In this case, the user can integrally handle the first and second frames. This facilitates the attaching and detaching work of the cover member with respect to the first and second frames.

(3) The device storage structure for a fluid chromatograph may further include a first angle restrictor that restricts an opening angle of the door from exceeding a first opening angle with the cover member attached to the first and second frames.

In this case, even in a case where the user operates the door carelessly, the door is prevented from being opened at an angle exceeding the first opening angle. Thus, interference of the door with another member provided around the casing can be prevented.

(4) A second angle restrictor that restricts an opening angle of the first frame from exceeding a second opening angle that is larger than the first opening angle with the cover member detached from the first and second frames may be formed.

In this case, even in a case where the user operates the first frame carelessly with the cover member detached from the first and second frames, the first frame is prevented from being opened at an angle exceeding the second opening angle. Thus, interference of the first frame with another member provided around the casing can be prevented.

Further, because the second opening angle is larger than the first opening angle, the user can largely ensure the work space for maintenance by detaching the cover member from the first and second frames.

(5) The cover member may be switchable between a fixed state where the cover member is coupled to the first frame based on a predetermined positional relationship and a sliding state where the cover member is slidable with respect to the first frame, and the device storage structure for a fluid chromatograph may further include a guide that slidably guides the cover member in one direction, and a snap-fit mechanism that switches the cover member to the fixed state by engaging the cover member with the first frame member when the cover member being slidable is put in the predetermined positional relationship with the first frame by the guide.

In this case, the user can easily attach the cover member to and detach the cover member from the first frame with the door opened.

(6) The device storage structure for a fluid chromatograph may further include first and second hinges that are provided at the casing to be located on the turning axis, wherein the first and second frames may be respectively provided at the casing to be turnable around the turning axis by the first and second hinges, and the first and second hinges may be configured to generate a holding force for holding an opening angle of the door at a reference angle when the opening angle of the door is the predetermined reference angle.

In this case, because the opening angle of the door is held at the reference angle, the opening of the door or closing of the door against the intention of the user is suppressed.

(7) The cover member may extend to have first and second ends, the first end may be closer to the turning axis than the second end and a thickness of the cover member may decrease from a portion closer to the second end than to the first end toward the first end, in a case where the cover member is viewed in a direction of the turning axis.

In this case, in a case where the opening angle of the door changes by a predetermined angle, a space required for the cover member to turn around the turning axis in the vicinity of the turning axis is reduced. Thus, the opening angle of the door can be increased while interference of the cover member with another member in the vicinity of the turning axis is suppressed.

(8) The device to be maintained may include a pump device for supplying a mobile phase to a column.

In this case, flexibility in layout of the pump device in the casing of the liquid sending device for the liquid chromatograph is improved. Further, a reduction in workability for maintaining the pump device and an increase in size of the casing are suppressed.

(9) The device to be maintained may include a fluid related device through which a mobile phase flows, a pipe that partially constitutes a flow path of the mobile phase may be connected to the fluid related device, and part of the door may form a pipe passage that causes an inner space of the casing to communicate with outside of the casing when the door is closed.

In this case, the pipe can be drawn out of the casing from the inside of the casing through the pipe passage. Further, the pipe can be drawn into the casing from the outside of the casing through the pipe passage.

(10) The device storage structure for a fluid chromatograph may further include a pipe holder that holds the pipe at the casing inwardly of the door when the door is closed.

In this case, the pipe is held at the casing by the pipe holder, so that a reduction in workability for maintaining the fluid related device due to the pipe is suppressed.

Advantageous Effects of Invention

The present invention improves flexibility in layout of the device to be maintained in the casing and can suppress a reduction in workability for maintaining the device and an increase in size of the casing.

DESCRIPTION OF EMBODIMENTS

[1] Basic Configuration of Device Storage Structure

Figure 1:
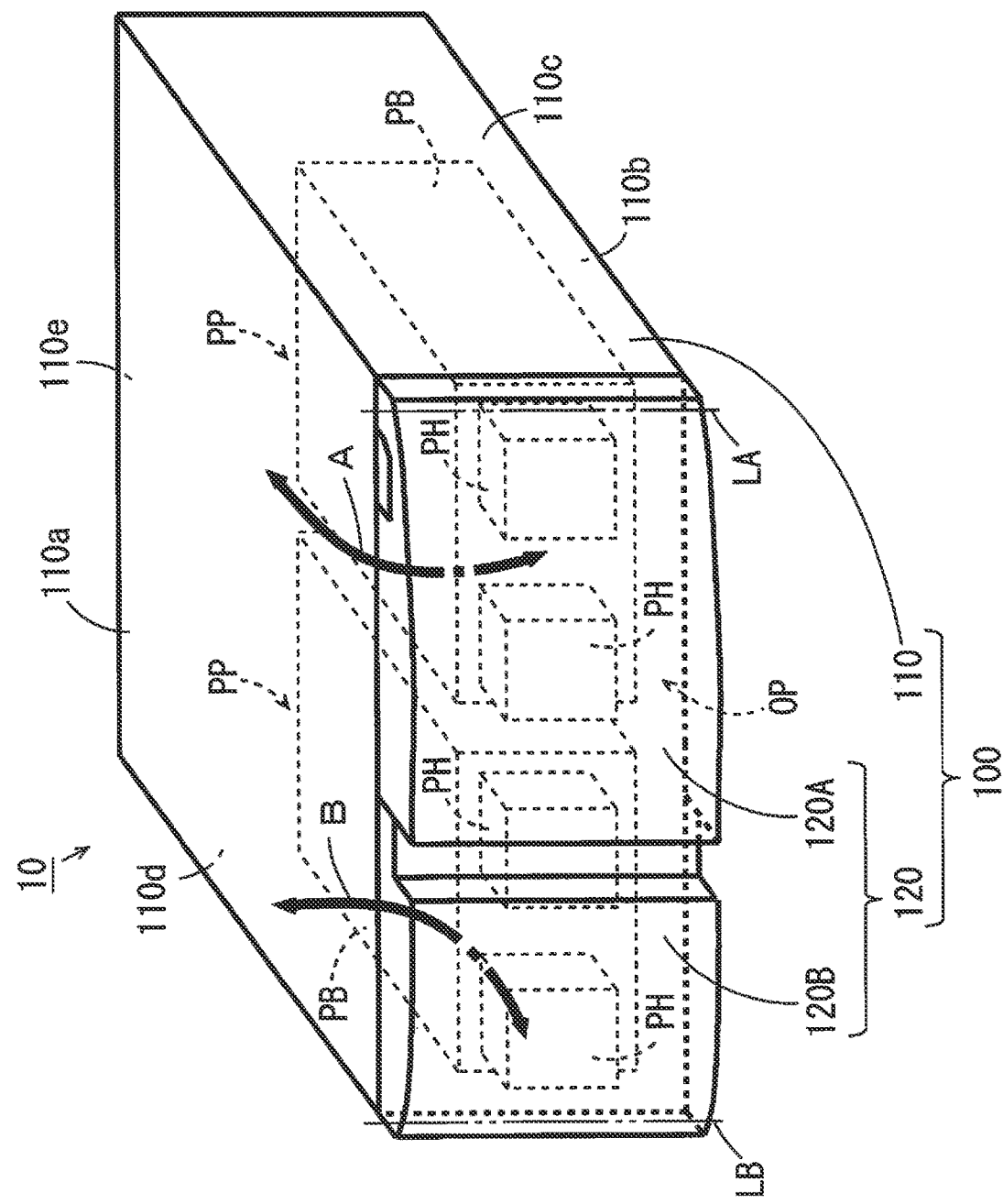
FIG. 1 is an external perspective view of a liquid sending device including a storage container according to one embodiment of the present invention.

A storage container to be used in a liquid sending device of a liquid chromatograph will be described as one example of a device storage structure according to one embodiment of the present invention. FIG. 1 is an external perspective view of the liquid sending device including the storage container according to the one embodiment of the present invention.

As shown in FIG. 1, the liquid sending device 10 of the present example has the configuration in which a plurality (two in the present example) of pump devices PP, a power supply circuit (not shown) and the like are stored in the storage container 100. The storage container 100 has a substantially cuboid shape and includes a casing 110 and a bi-parting door 120. The casing 110 includes an upper wall 110a, a lower wall 110b, one sidewall 110c, another sidewall 110d and an end surface wall 110e.

The upper wall 110a and the lower wall 110b are formed to face each other in an up-and-down direction. The one sidewall 110c connects one side of the upper wall 110a to one side of the lower wall 110b, the other sidewall 110d connects another side of the upper wall 110a to another side of the lower wall 110b, and the one side wall 110c and the other sidewall 110d are formed to face each other. The end surface wall 110e is perpendicular to the upper wall 110a, the lower wall 110b, the one sidewall 110c and the other sidewall 110d, and is connected to the ends of the upper wall 110a, the lower wall 110b, the one sidewall 110c and the other sidewall 110d.

The casing 110 has an opening OP in a portion opposite to the end surface wall 110e. The bi-parting door 120 includes doors 120A, 120B. The door 120A is provided at the one sidewall 110c to close and open an area (hereinafter referred to as a one opening area) from the one sidewall 110c to substantially the center of the opening OP in the opening OP. The door 120B is provided at the other sidewall 110d to close and open an area (hereinafter referred to as another opening area) except for the one opening area in the opening OP.

When the one opening area is closed and opened by the door 120A, the door 120A turns around a turning axis LA as indicated by the thick one-dot and dash arrow A in FIG. 1. The turning axis LA extends in the up-and-down direction in the vicinity of the one sidewall 110c.

On the other hand, when the other opening area is closed and opened by the door 120B, the door 120B turns around a turning axis LB as indicated by the thick one-dot and dash arrow B in FIG. 1. The turning axis LB extends in the up-and-down direction in the vicinity of the other sidewall 110d.

In the following description, the bi-parting door 120 and its peripheral portions of the liquid sending device 10 of FIG. 1 are referred to as a front portion of the liquid sending device 10, and the end surface wall 110e and its peripheral portions of the liquid sending device 10 are referred to as a rear portion of the liquid sending device 10. Further, the direction directed from the inside of the storage container 100 toward the front portion of the liquid sending device 10 is referred to as forward, and the direction directed from the inside of the storage container 100 toward the rear portion of the liquid sending device 10 is referred to as rearward.

Each of the two pump devices PP has the configuration in which one drive motor (not shown) and two pump heads PH are assembled into one pump body PB. In each pump device PP, two plungers (not shown) are provided in each of the two pump heads PH. The drive motor drives the two plungers in the two pump heads PH by receiving power from the power supply circuit (not shown) (a double plunger system). This causes each plunger to reciprocate in the pump head PH.

In each pump device PP, the two pump heads PH are located in the front portion of the liquid sending device 10 inside of the storage container 100, and the pump body PB is located at a position farther rearward than the two pump heads PH in the liquid sending device 10. Thus, when the bi-parting door 120 is closed, each pump head PH is close to the inner surface of the bi-parting door 120.

In the liquid sending device 10 having the above-mentioned configuration, it is necessary to maintain each pump device PP by replacing its component, etc., in order to stably send a mobile phase. In this case, a user accesses each pump head PH through the opening OP by opening the bi-parting door 120.

Figure 2A:
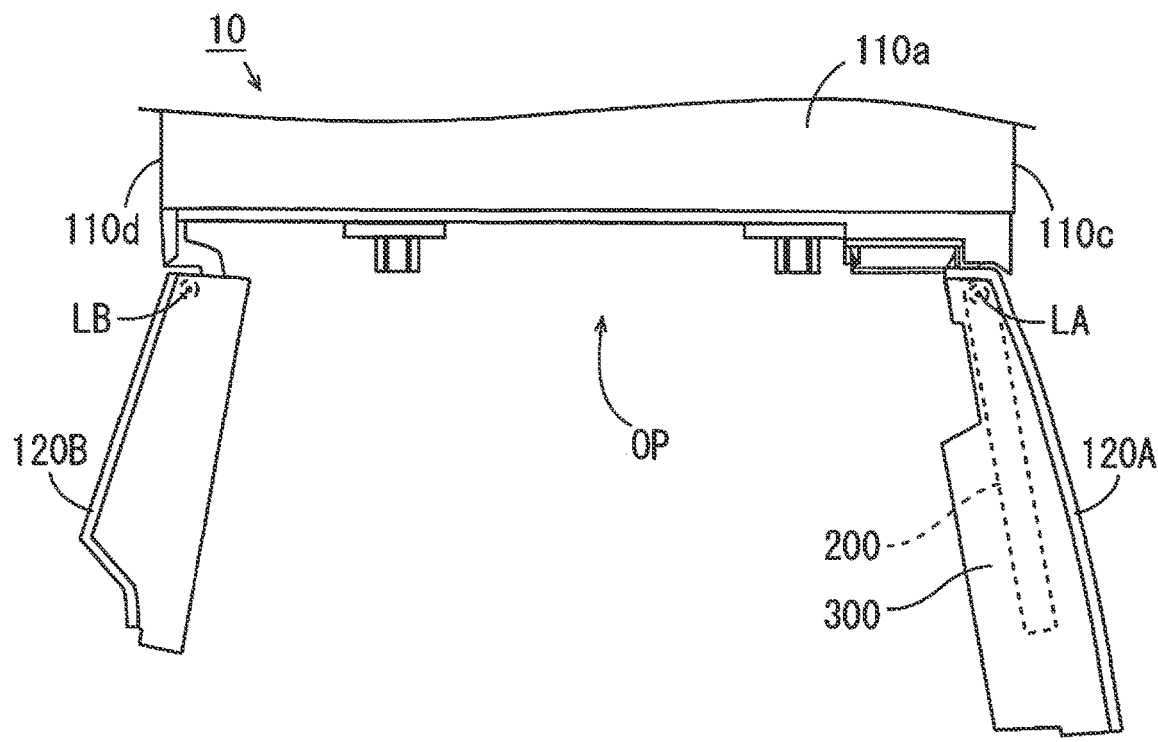
FIG. 2A is an enlarged plan view of a front portion of the liquid sending device showing a bi-parting door being opened.
Figure 2B:
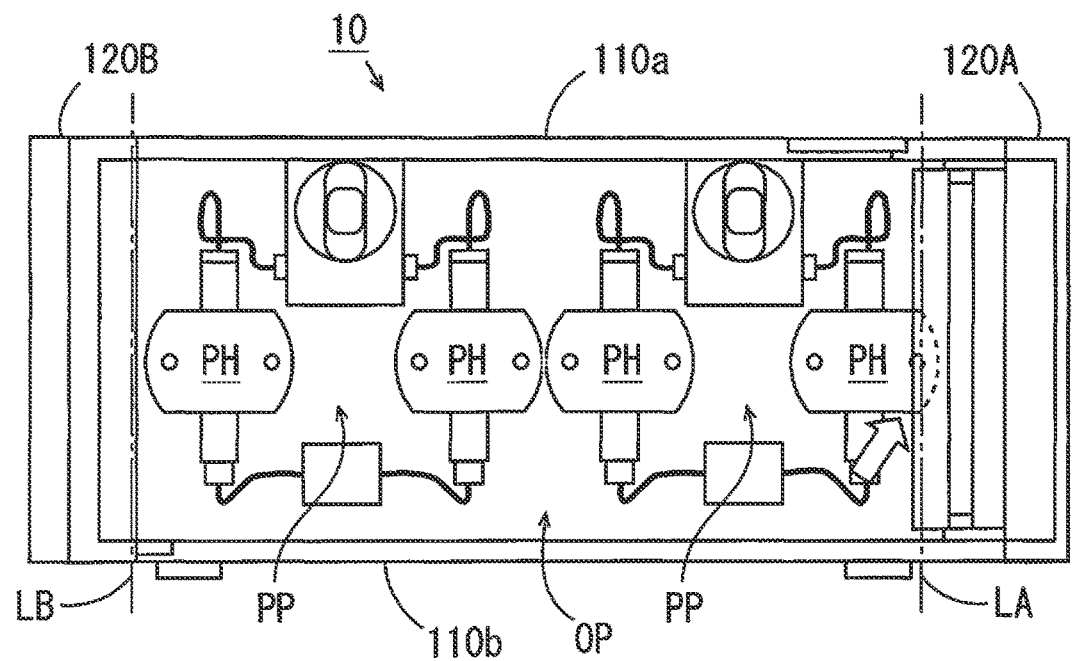
FIG. 2B is a front view of the liquid sending device showing the bi-parting door being opened.

FIG. 2A is an enlarged plan view of the front portion of the liquid sending device 10 showing the bi-parting door 120 being opened, and FIG. 2B is a front view of the liquid sending device 10 showing the bi-parting door 120 being opened. In each of FIGS. 2A, 2B and FIGS. 3A and 3B, described below, a pipe connected to each pump device PP is not shown.

As shown in FIGS. 2A and 2B, when the bi-parting door 120 is opened, large parts of the plurality of pump heads PH are exposed forwardly of the liquid sending device 10 through the opening OP. However, as indicated by the outlined arrow in FIG. 2B, in a case where a portion of the door 120A is present forwardly of the pump head PH in the vicinity of the turning axis LA, the entire pump head PH is not exposed forwardly. In this case, workability for maintaining the pump head PH is reduced markedly.

As such, in the present embodiment, the door 120A is mainly constituted by a frame member 200 and a cover member 300. The frame member 200 is a single member formed of metal such as an aluminum alloy, and the cover member 300 is a single member formed of resin, for example.

The frame member 200 is provided at the one sidewall 110c by a door attachment 90 (FIG. 6), described below, to be turnable around the turning axis LA. The cover member 300 is formed to be attachable to and detachable from the frame member 200 and cover the one opening area of the opening OP when the door 120A is closed.

Figure 3A:
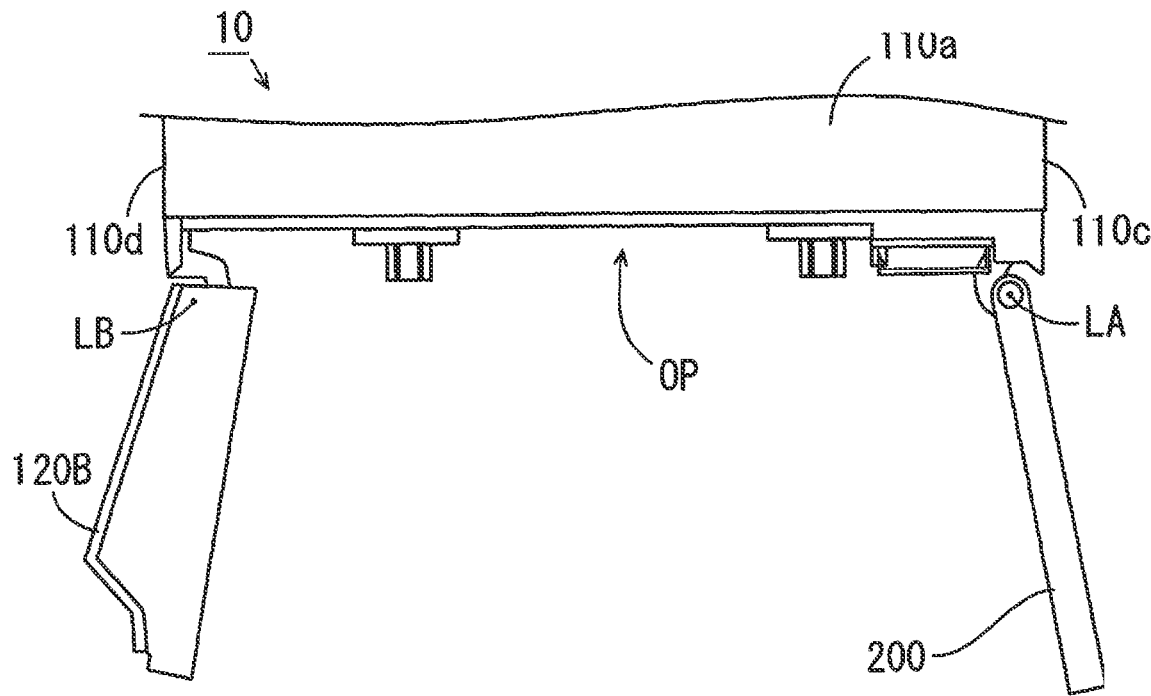
FIG. 3A is an enlarged plan view of a front portion of the liquid sending device showing a cover member being detached from a frame member of the door.

In the door 120A, the cover member 300 is detached from the frame member 200 with the door 120A opened. FIG. 3A is an enlarged plan view of the front portion of the liquid sending device 10 showing the cover member 300 being detached from the frame member 200 in the door 120A, and FIG. 3B is a front view of the liquid sending device 10 showing the cover member 300 being detached from the frame member 200 in the door 120A.

Figure 3B:
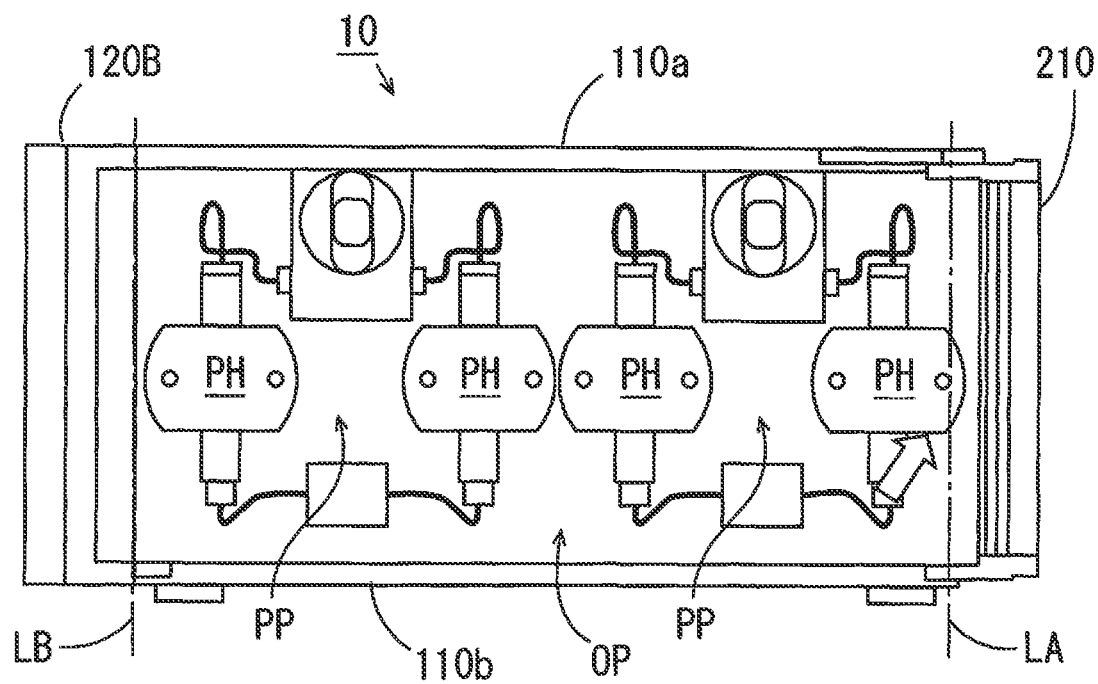
FIG. 3B is a front view of the liquid sending device showing the cover member being detached from the frame member of the door.

As shown in FIG. 3B, with the cover member 300 detached, a member that constitutes the door 120A is hardly present on the turning axis LA. Therefore, as indicated by the outlined arrow in FIG. 3B, the entire pump head PH in the vicinity of the turning axis LA is exposed forwardly. Therefore, a reduction in workability for maintaining the pump head PH is suppressed. Further, in this case, the location of the pump head PH can be defined regardless of the position of the turning axis LA in the casing 110. Thus, in the casing 110, flexibility in layout of the pump head PH is improved, and an increase in size of the casing 110 can be suppressed. Details of the configuration of the door 120A will be described below.

[2] Frame Member 200

In the following description, out of the frame member 200, the surface directed inwardly of the casing 110 (rearwardly of the liquid sending device 10) when the door 120A is closed is referred to as an inner surface of the frame member 200, and the surface directed outwardly of the casing 110 (forwardly of the liquid sending device 10) when the door 120A is closed is referred to as an outer surface of the frame member 200.

Figure 4A:
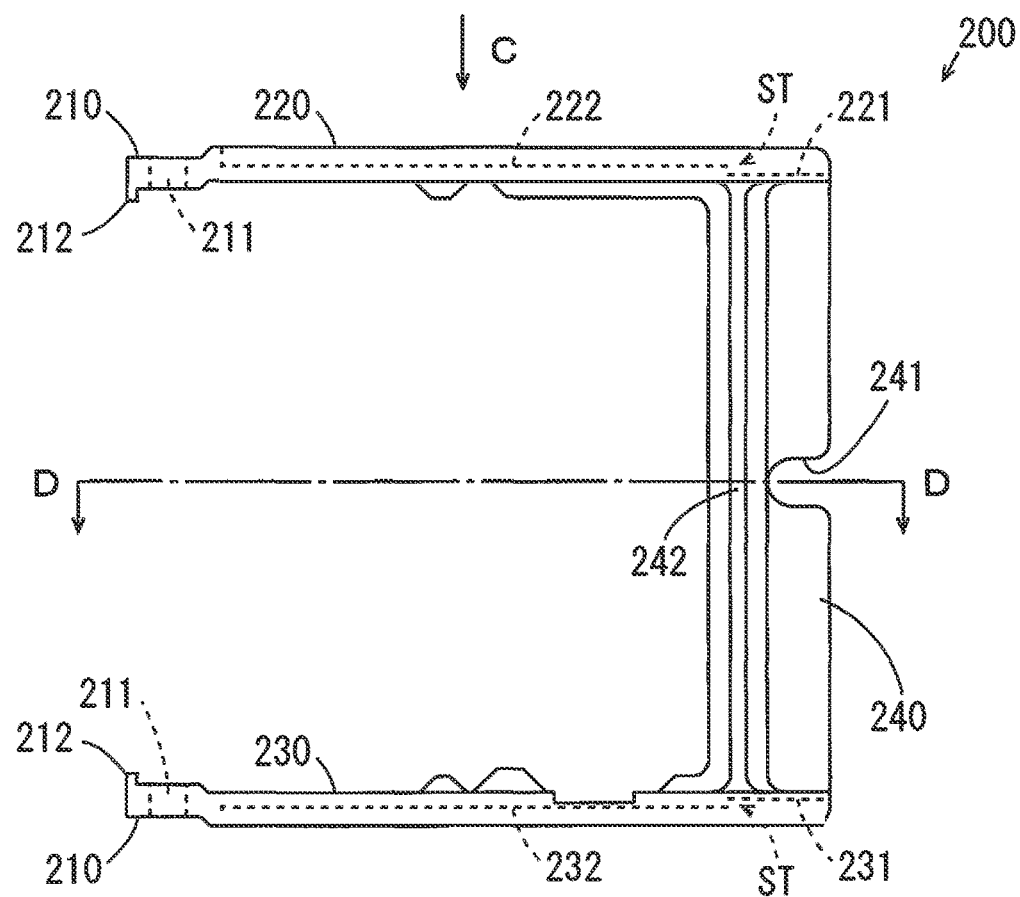
FIG. 4A is a diagram of the frame member of FIGS. 3A and 3B as viewed from a position opposite to its inner surface.
Figure 4B:
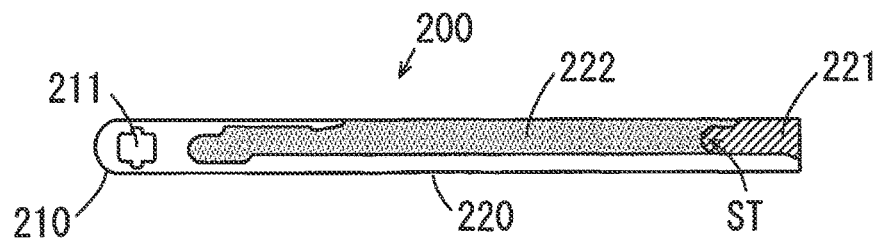
FIG. 4B is a diagram of the frame member as viewed in the direction of the arrow C of FIG. 4A
Figure 4C:
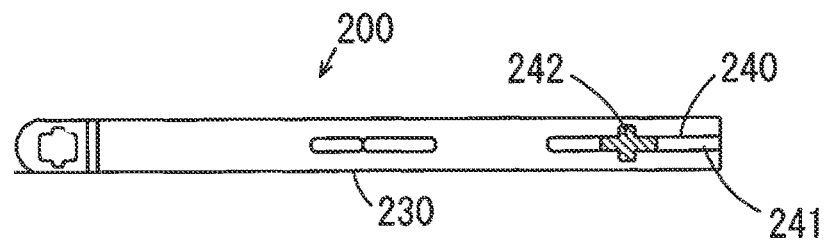
FIG. 4C is a cross sectional view taken along the line D-D of FIG. 4A.

FIG. 4A is a diagram of the frame member 200 of FIGS. 3A and 3B as viewed from a position opposite to its inner surface, FIG. 4B is a diagram of the frame member 200 as viewed in a direction of the arrow C of FIG. 4A and FIG. 4C is a cross sectional view taken along the line D-D of FIG. 4A.

As shown in FIG. 4A, the frame member 200 is mainly constituted by an upper frame 220, a lower frame 230 and a frame coupler 240. The upper frame 220 and the lower frame 230 respectively have a substantially prismatic shape, are arranged in the up-and-down direction to be opposite to each other and extend in parallel with each other.

One end of each of the upper frame 220 and the lower frame 230 functions as a hinge attachment portion 210. A hinge insertion hole 211 into which a hinge HI (FIG. 6), described below, is to be inserted is formed in the hinge attachment portion 210. Further, an angle restrictor 212 is provided at the hinge attachment portion 210. The angle restrictor 212 is used to restrict an opening angle of the frame member 200 from exceeding a second opening angle β (FIG. 9C). Details of the angle restrictor 212 will be described below.

As shown in FIG. 4B, a first guide groove 221 and a second guide groove 222 are formed in an upwardly directed portion of the upper frame 220. In FIG. 4B, a dotted pattern and hatching are respectively applied to the first guide groove 221 and the second guide groove 222 in order to facilitate understanding of the shapes of the first guide groove 221 and the second guide groove 222. The first and second guide grooves 221, 222 have different distances (depths) from the upper end surface of the upper frame 220 to the bottom surface. The depth of the first guide groove 221 is larger than that of the second guide groove 222.

The first guide groove 221 is formed to extend from the other end toward the one end (the hinge attachment portion 210) of the upper frame 220 by a relatively short distance. In the portion of the first guide grove 221 excluding its tip, one inner side surface out of the two inner side surfaces holding the bottom surface therebetween is not formed. Further, the first guide groove 221 is opened on the outer surface of the frame member 200. The second guide groove 222 is formed to further extend from the tip of the first guide groove 221 to a position in the vicinity of the hinge attachment portion 210 by a relatively long distance. Similarly to the first guide groove 221, in the portion of the second guide groove 222 excluding its tip, one inner side surface is not formed. Further, the second guide groove 22 is opened on the outer surface of the frame member 200. A step ST is formed between the first guide groove 221 and the second guide groove 222.

Similarly to the forwardly directed portion of the upper frame 220, a first guide groove 231 and a second guide groove 232 are formed in the downwardly directed portion of the lower frame 230. The first guide groove 231 and the second guide groove 232 have different distances (depths) from the lower end surface of the lower frame 230 to the bottom. The depth of the first guide groove 231 is larger than that of the second guide groove 232.

The configuration of the first guide groove 231 and the second guide groove 232 in the lower frame 230 is basically the same as that of the first guide groove 221 and the second guide groove 222 in the upper frame 220. A step ST is formed between the first guide groove 231 and the second guide grooves 232.

The other ends of the upper frame 220 and the lower frame 230 are coupled to each other by the frame coupler 240 having a substantially elongated plate shape. A cutout 241 is formed in the center in the up-and-down direction of the frame coupler 240. Therefore, as shown in FIGS. 4A and 4C, the width in the horizontal direction in the center of the frame coupler 240 is smaller than that of the rest of the portion of the frame coupler 240. The center of this frame coupler 240 functions as an engaged portion 242 with which a snap-fit mechanism SF (FIGS. 5A and 5C), described below, engages.

[3] Cover Member 300

In the following description, out of the cover member 300, the surface directed inwardly of the casing 110 (rearwardly of the liquid sending device 10) when the door 120A is closed is referred to as an inner surface of the cover member 300, and the surface directed outwardly (forwardly of the liquid sending device 10) of the casing 110 when the door 120A is closed is referred to as an outer surface of the cover member 300.

Figure 5A:
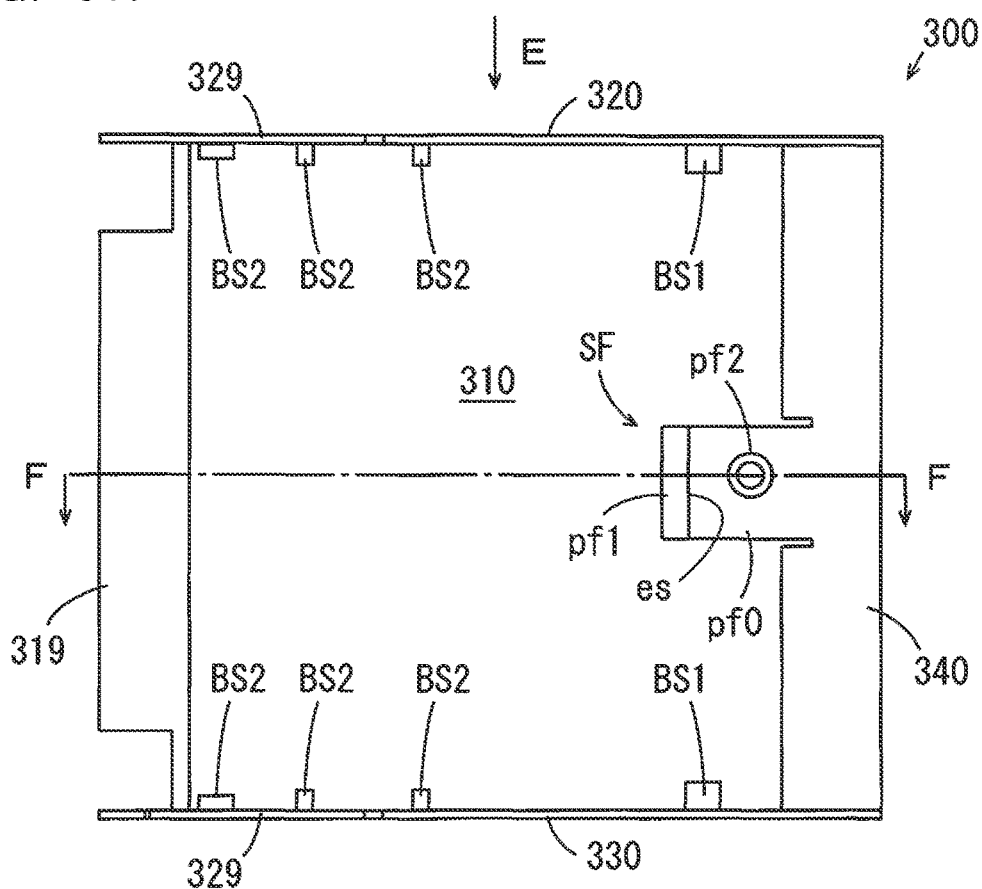
FIG. 5A is a diagram of the cover member of FIGS. 2A and 2B as viewed from a position opposite to its inner surface.
Figure 5B:
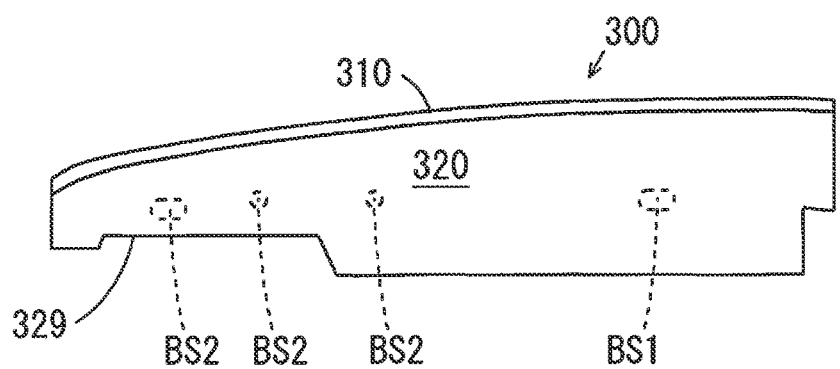
FIG. 5B is a diagram of the cover member as viewed in the direction of the arrow E of FIG. 5A
Figure 5C:
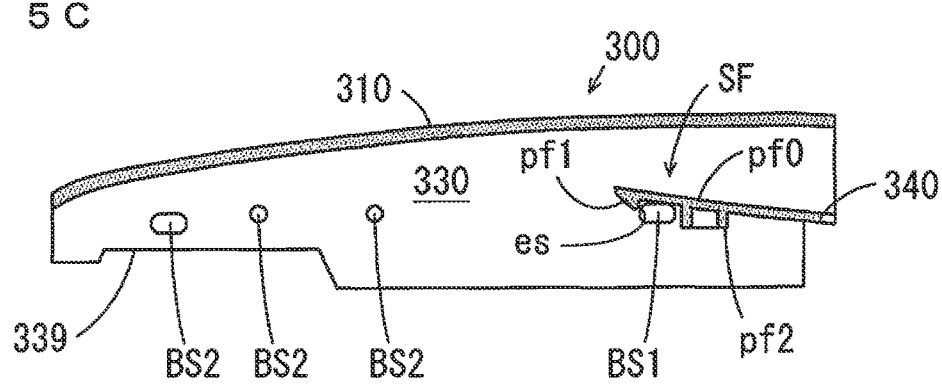
FIG. 5C is a cross sectional view taken along the line F-F of FIG. 5A.

FIG. 5A is a diagram of the cover member 300 of FIGS. 2A and 2B as viewed from a position opposite to its inner surface, FIG. 5B is a diagram of the cover member 300 as viewed in a direction of the arrow E of FIG. 5A and FIG. 5C is a cross sectional view taken along the line F-F of FIG. 5A.

As shown in FIG. 5A, the cover member 300 is mainly constituted by a lid 310, an upper wall 320 and a lower wall 330. As shown in FIGS. 5A to 5C, the lid 310 has a substantially rectangular plate shape and is formed to extend in one direction while being gently curved in a horizontal direction. An angle restrictor 319 is provided at one end in the horizontal direction of the lid 310. The angle restrictor 319 is used to restrict an opening angle of the door 120A from exceeding a first opening angle α (FIG. 8B), described below. Details of the angle restrictor 319 will be described below.

As shown in FIGS. 5A and 5B, the upper wall 320 has a plate shape that extends from the upper edge of the lid 310 in the direction in which the inner surface of the lid 310 is directed. A cutout 329 that forms a pipe passage 130 (FIG. 10), described below, when the door 120A (FIG. 1) is closed is provided in one portion of the upper wall 320. The lower wall 330 has the same shape as that of the upper wall 320.

The dimension between the upper wall 320 and the lower wall 330 in the up-and-down direction is slightly larger than the dimension from the upper end surface of the upper frame 220 of FIGS. 4A to 4C to the lower end surface of the lower frame 230 of FIGS. 4A to 4C. Thus, the upper wall 320 and the lower wall 330 of the cover member 300 can hold the frame member 200 in the up-and-down direction.

At the lower surface of the upper wall 320, a plurality (four in the present example) of projections BS1, BS2 that project downwardly are formed to be arranged on a straight line at intervals. The one projection BS1 out of the four projections BS1, BS2 has a larger distance (height) from the lower surface of the upper wall 320 to the tip than the other three projections BS2. On the upper surface of the lower wall 330, one projection BS1 and three projections BS2 projecting upwardly are formed to be arranged on a straight line at intervals to respectively be opposite to the one projection BS1 and the three projections BS2 formed at the lower surface of the upper wall 320. The height of each projection BS1 is substantially equal to the depth of the first guide grooves 221, 231 of FIGS. 4A, 4B, and the height of each projection BS2 is substantially equal to the depth of the second guide grooves 222, 232 of FIGS. 4A, 4B.

The upper wall 320 and the lower wall 330 face each other. A cover coupler 340 having a substantially elongated plate shape is formed to connect a portion of the lower surface of the upper wall 320 to a portion of the upper surface of the lower wall 330.

A snap-fit mechanism SF that can engage with the engaged portion 242 of FIGS. 4A, 4C is provided at substantially the center of the cover coupler 340. In the present embodiment, a snap-fit is the coupling method of two members respectively having an engaging portion and an engaged portion, and is the method of using elastic deformation of at least one member out of the engaged portion and the engaging portion and fixing the two members.

As shown in FIGS. 5A and 5C, the snap-fit mechanism SF of the present example includes an elastic deformer pf0 and two projections pf1, pf2. The elastic deformer pf0 has a planar shape and extends from the cover coupler 340 toward the angle restrictor 319 of the lid 310 by a certain distance.

The two projections pf1, pf2 project inwardly of the elastic deformer pf0 to be arranged in the horizontal direction at a predetermined distance. The projection pf1 that is located at the tip of the elastic deformer pf0 has an engaging surface es opposite to the other projection pf2.

When the cover member 300 is to be attached to the frame member 200 (FIGS. 4A to 4C), the engaged portion 242 (FIGS. 4A, 4C) of the frame member 200 is guided to a position between the two projections pf1, pf2 by elastic deformation of the elastic deformer pf0. When the cover member 300 is to be detached, the engaged portion 242 (FIGS. 4A, 4C) of the frame member 200 is detached from the position between the two projections pf1, pf2 by elastic deformation of the elastic deformer pf0. Details of attachment and detachment of the cover member 300 with respect to the frame member 200 will be described below.

[4] Attachment and Detachment of Cover Member 300 with Respect to Frame Member 200

Figure 6:
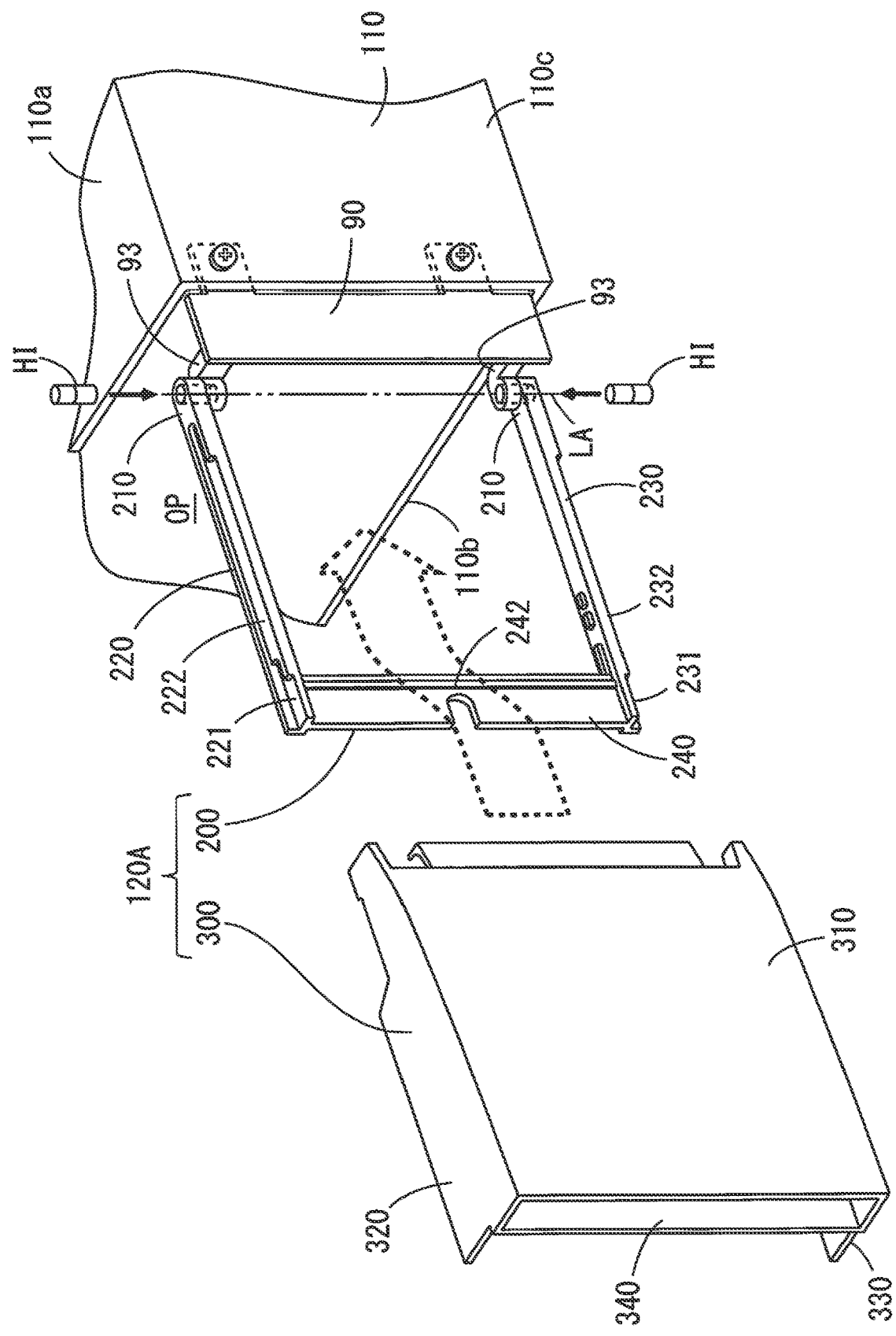
FIG. 6 is an external perspective view for explaining the attachment state of the frame member to a casing and the method of attaching the cover member to the frame member.

The method of attaching the cover member 300 to the frame member 200 will be described together with the attachment state of the frame member 200 with respect to the casing 110. FIG. 6 is an external perspective view for explaining the attachment state of the frame member 200 with respect to the casing 110 and the method of attaching the cover member 300 to the frame member 200. First, the attachment state of the frame member 200 with respect to the casing 110 will be described.

As shown in FIG. 6, the door attachment 90 having a substantially elongated plate shape is fixed to the front end of the one sidewall 110c of the casing 110 to extend the one sidewall 110c forwardly. While being a metallic single member in the present example, the door attachment 90 may be a resin single member. Hinge attachment portions 93 are respectively provided in the vicinity of the upper end and in the vicinity of the lower end of the door attachment 90. Each hinge attachment portion 93 is formed to extend from the door attachment 90 to the space forward of the opening OP. A through hole is formed in the tip of the hinge attachment portion 93.

The hinge attachment portion 210 of the upper frame 220 is positioned on the upper surface of the upper hinge attachment portion 93, and the hinge attachment portion 210 of the lower frame 230 is positioned on the lower surface of the lower hinge attachment portion 93. In this state, a hinge HI having a substantially columnar shape is inserted into the hinge insertion hole 211 (FIGS. 4A to 4C) of the upper frame 220 and the through hole of the upper hinge attachment portion 93 of the door attachment 90. Further, a hinge HI having a substantially columnar shape is inserted into the hinge insertion hole 211 (FIGS. 4A to 4C) of the lower frame 230 and the through hole of the lower hinge attachment portion 93 of the door attachment 90. Each hinge HI is provided such that its axial center is located on the turning axis LA. Thus, the frame member 200 is attached to the door attachment 90 by the upper and lower hinges HI to be turnable around the turning axis LA.

When the cover member 300 is to be attached to the frame member 200, the user moves the cover member 300 closer to the turning axis LA along the outer surface of the frame member 200 as indicated by the thick dotted outlined arrow.

Specifically, the user brings the inner surface of the cover member 300 close to the outer surface of the frame member 200 such that the upper frame 220 and the lower frame 230 of the frame member 200 are held by the upper wall 320 and the lower wall 330 of the cover member 300 in the up-and-down direction. In addition, the user arranges the plurality of projections BS2 formed at the upper wall 320 of FIGS. 5A, 5B in the second guide groove 222 of the upper frame 220 of FIGS. 4A, 4B and arranges the plurality of projections BS2 formed on the lower wall 330 of FIGS. 5A, 5C in the second guide groove 232 of the lower frame 230 of FIG. 4A. Further, the user arranges the projection BS1 formed on the upper wall 320 of FIGS. 5A, 5B in the first guide groove 221 of the upper frame 220 of FIGS. 4A, 4B and arranges the projection BS1 formed on the lower wall 330 of FIGS. 5A, 5C in the first guide groove 231 of the lower frame 230 of FIG. 4A. Thereafter, the user brings the cover member 300 close to the turning axis LA.

In this case, in each of the second guide grooves 222, 232, the plurality of projections BS2 of the cover member 300 abut against at least one inner side surface of the second guide grooves 222, 232. Further, in each of the first guide grooves 221, 231, the plurality of projections BS2 of the cover member 300 abut against at least one inner side surface of the first guide grooves 221, 231. Thus, the cover member 300 is guided in a predetermined attitude in a direction toward the turning axis LA to be slidable with respect to the frame member 200.

As described above, the cover member 300 is moved toward the turning axis LA in the predetermined attitude, whereby the engaged portion 242 (FIGS. 4A, 4C) of the frame member 200 comes into contact with the snap-fit mechanism SF (FIGS. 5A, 5C) of the cover member 300. Further, the cover member 300 is further moved, whereby the elastic deformer pf0 (FIG. 5A) of the snap-fit mechanism SF is elastically deformed to be closer to the lid 310, and the engaged portion 242 is guided to the position between the two projections pf1, pf2. Thereafter, the engaged portion 242 of the frame member 200 is engaged with the engaging surface es (FIGS. 5A, 5C) of the snap-fit mechanism SF. Further, at this time, the upper and lower projections BS1 (FIGS. 5A to 5C) of the cover member 300 abut against the steps ST formed in the upper and lower grooves of the frame member 200.

As described above, the cover member 300 is engaged with and fixed to the frame member 200 by the snap-fit mechanism SF. Thus, attachment of the cover member 300 to the frame member 200 is completed.

Figure 7A:
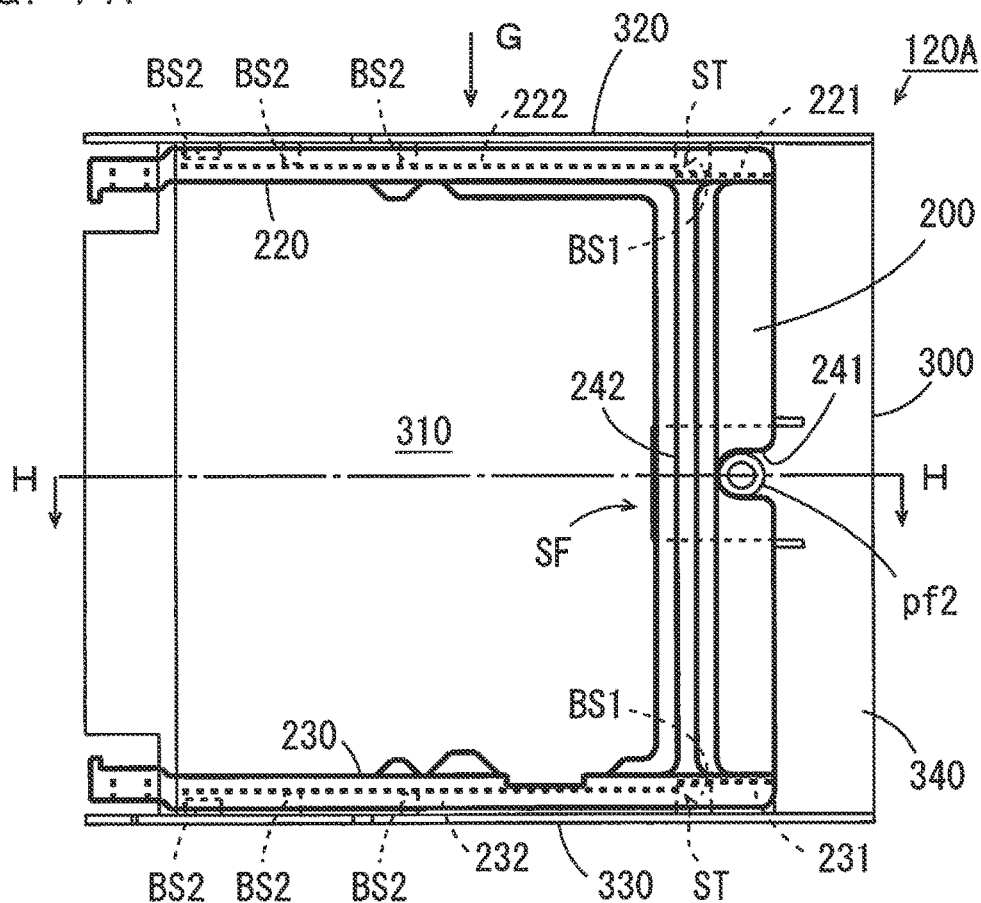
FIG. 7A is a diagram of the door in which the cover member is attached to the frame member from a position opposite to its inner surface.
Figure 7B:
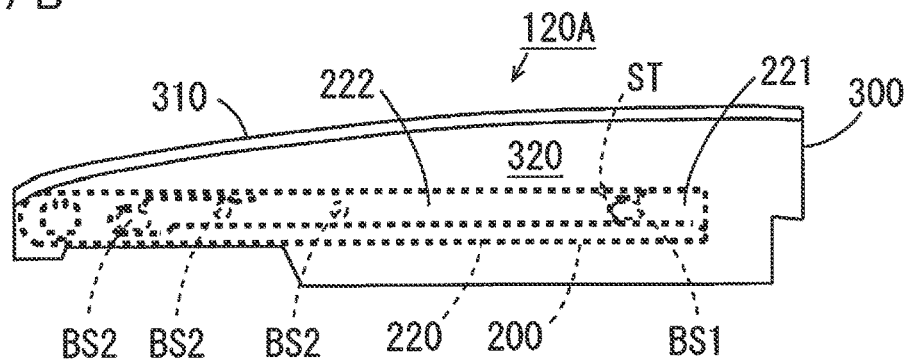
FIG. 7B is a diagram of the door as viewed in a direction of the arrow G of FIG. 7A
Figure 7C:
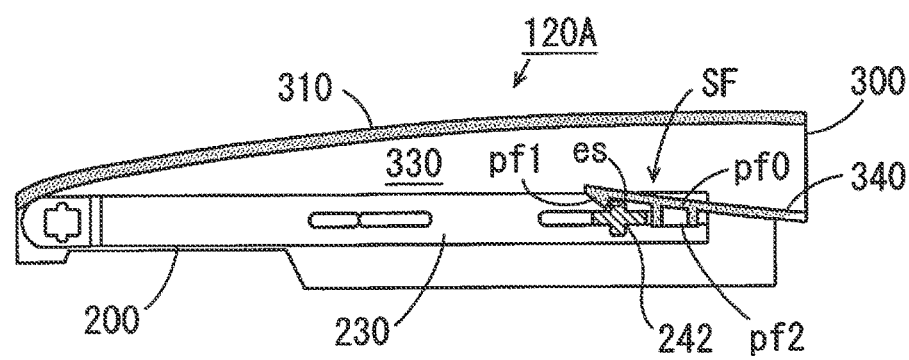
FIG. 7C is a cross sectional view taken along the line H-H of FIG. 7A.

FIG. 7A is a diagram of the door 120A in which the cover member 300 is attached to the frame member 200 as viewed from a position opposite to its inner surface, FIG. 7B is a diagram of the door 120A as viewed in the direction of the arrow G of FIG. 7A and FIG. 7C is a cross sectional view taken along the line H-H of FIG. 7A. In FIGS. 7A and 7B, in order to facilitate understanding of the shapes of the frame member 200 and the cover member 300, the frame member 200 is indicated by the thick solid lines and the thick dotted lines, and the cover member 300 is indicated by the thin solid lines and the thin dotted lines.

As shown in FIGS. 7A and 7C, with the cover member 300 attached to the frame member 200, the engaged portion 242 of the frame member 200 is arranged between the two projections pf1, pf2 of the snap-fit mechanism SF and engaged with the engaging surface es of the projection pf1 at the tip. This restricts the cover member 300 from sliding in the direction away from the turning axis LA (FIG. 6) (the direction away from the frame member 200).

Further, as shown in FIGS. 7A and 7B, the upper and lower projections BS1 of the cover member 300 abut against the steps ST formed at the tips of the first guide grooves 221, 231 of the frame member 200. This restricts the cover member 300 from sliding in the direction toward the turning axis LA (FIG. 6).

As shown in FIGS. 7A and 7B, with the cover member 300 attached to the frame member 200, one of the plurality of projections BS2 formed on the upper wall 320 is located at the tip of the second guide groove 222 of the upper frame 220. The projection BS1 formed on the upper wall 320 is located at the tip of the first guide groove 221. Further, one of the plurality of projections BS2 formed on the lower wall 330 is located at the tip of the second guide groove 232 of the lower frame 230. The projection BS1 formed on the lower wall 330 is located at the tip of the first guide groove 231. This restricts the cover member 300 from moving in the direction perpendicular to the inner and outer surfaces of the frame member 200.

In this manner, with the cover member 300 attached to the frame member 200, the movement of the cover member 300 with respect to the frame member 200 is restricted. Thus, the frame member 200 and the cover member 300 can be integrally handled, so that the operation of opening and closing the door 120A is stabilized.

In a case where the cover member 300 is detached from the frame member 200, the user presses the projection pf2 of the snap-fit mechanism SF toward the lid 310. In this case, the elastic deformer pf0 is elastically deformed to be closer to the lid 310, and the engaged portion 242 of the frame coupler 240 is detached from the snap-fit mechanism SF. Thus, the engaging state of the snap-fit mechanism SF with the engaged portion 242 is released. In addition, the user slides the cover member 300 with respect to the frame member 200 in the direction away from the turning axis LA. Thus, the cover member 300 can be easily detached from the frame member 200.

[5] Mechanism for Restricting Opening Angle of Door 120A and Frame Member 200

The storage container 100 according to the present embodiment is provided with a door angle restriction mechanism for restricting the opening angle of the door 120A from exceeding the predetermined first opening angle α with the cover member 300 attached to the frame member 200. The door angle restriction mechanism is constituted by the angle restrictor 319 provided at the cover member 300 of FIGS. 5A to 5C and door angle restrictors respectively provided at the two hinge attachment portions 93 of FIG. 6.

Figure 8A:
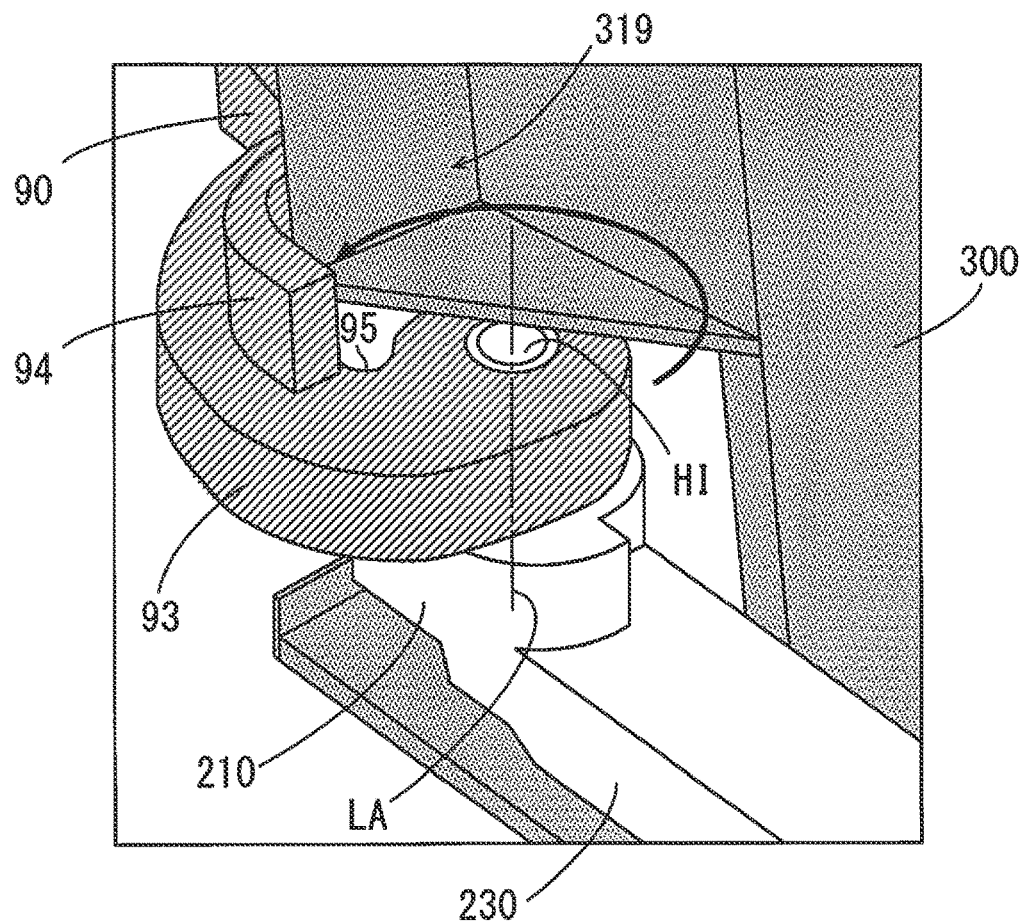
FIGS. 8A and 8B are diagrams for explaining a door angle restriction mechanism.
Figure 8B:
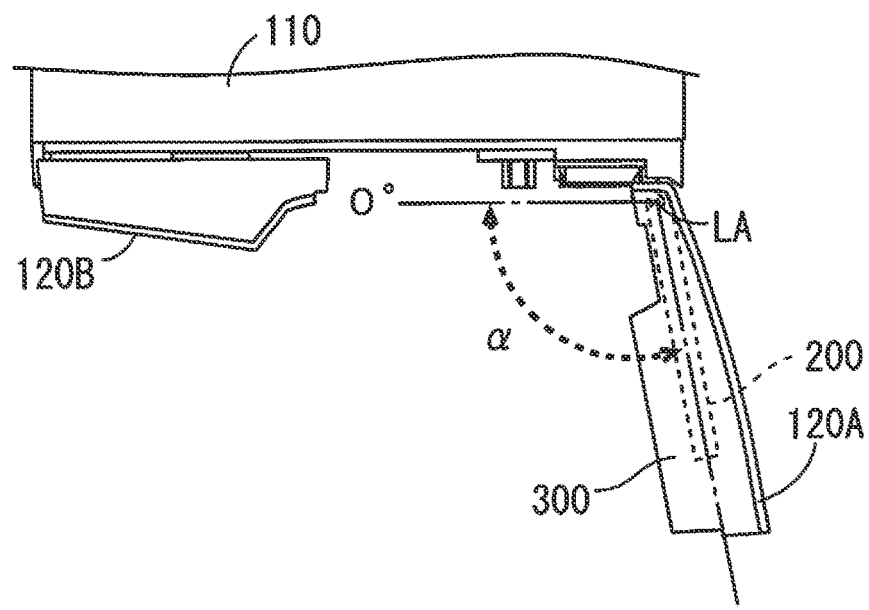

FIGS. 8A and 8B are diagrams for explaining the door angle restriction mechanism. As described above, the angle restrictor 319 is formed at one end of the cover member 300. As shown in FIG. 8A, the angle restrictor 319 is located at a position spaced apart from the turning axis LA with the cover member 300 attached to the frame member 200. Therefore, when the door 120A is opened, the angle restrictor 319 turns around the turning axis LA as indicated by the thick solid arrow in FIG. 8A. In FIG. 8A, in order to facilitate understanding of the shapes of the cover member 300 and the hinge attachment portion 93 of the door attachment 90, a dotted pattern is applied to the cover member 300 and hatching is applied to the hinge attachment portion 93.

As shown in FIG. 8B, the door angle restrictor 94 is arranged on an orbit of turn of the angle restrictor 319 such that the angle restrictor 319 abuts against the door angle restrictor 94 when the opening angle of the door 120A is the first opening angle α. With such a configuration, in a case where the opening angle of the door 120A is 0° when the door 120A is closed, the opening angle of the door 120A is restricted in a range from 0° to the first opening angle α.

In this case, even in a case where the user operates the door 120A carelessly, the door 120A is prevented from being open at an angle exceeding the first opening angle α. Thus, the door 120A can be prevented from interfering with another member provided around the storage container 100.

The storage container 100 according to the present embodiment is provided with a frame angle restriction mechanism for restricting the opening angle of the frame member 200 from exceeding the predetermined second opening angle β with the cover member 300 detached from the frame member 200. The frame angle restriction mechanism is constituted by the angle restrictors 212 provided at the frame member 200 of FIGS. 4A to 4C and frame angle restrictors respectively provided at the two hinge attachment portions 93 of FIG. 6.

Figure 9A:
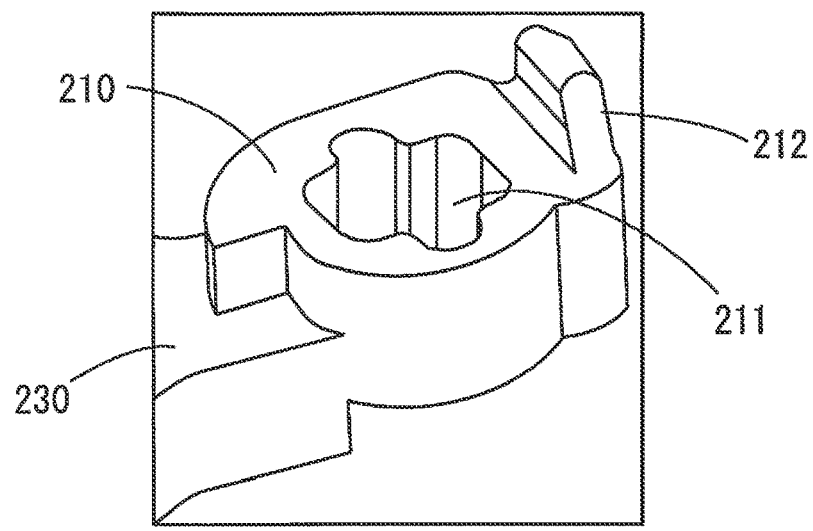
FIGS. 9A, 9B and 9C are diagrams for explaining a frame angle restriction mechanism.
Figure 9B:
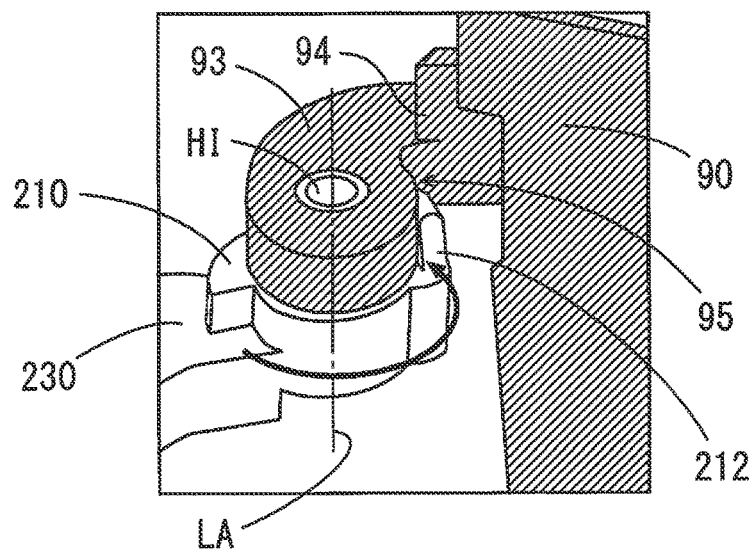
Figure 9C:
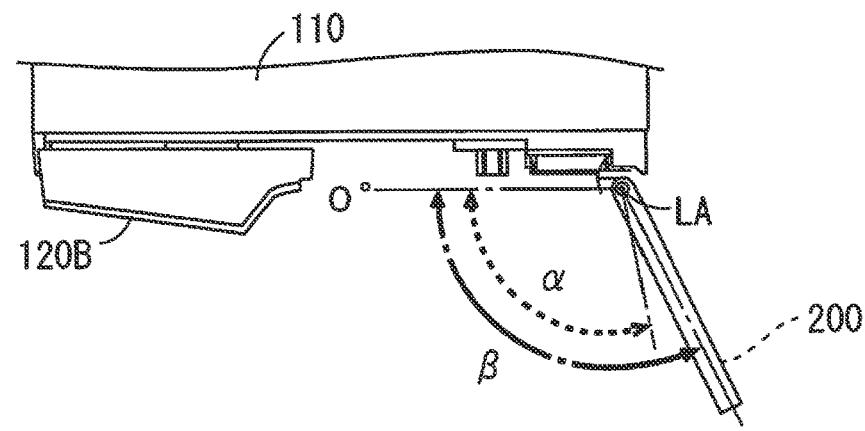

FIGS. 9A to 9C are diagrams for explaining the frame angle restriction mechanism. As described above, the angle restrictors 212 are formed at the hinge attachment portions 210 of the upper frame 220 and the lower frame 230. As shown in FIG. 9A, the angle restrictor 212 is formed at a position outside of the hinge insertion hole 211 to project from one surface of the hinge attachment portion 210 abutting against the hinge attachment portion 93 of the door attachment 90.

In this case, the angle restrictor 212 is spaced apart from the turning axis LA as shown in FIG. 9B with the hinge attachment portion 210 of the frame member 200 attached to the hinge attachment portion 93 of the door attachment 90. Therefore, when the frame member 200 is opened, the angle restrictor 212 turns around the turning axis LA as indicated by the thick solid arrow in FIG. 9B. In FIG. 9B, in order to facilitate understanding of the shape of the hinge attachment portion 93 of the door attachment 90, hatching is applied to the hinge attachment portion 93.

As shown in FIG. 9C, the frame angle restrictor 95 is arranged on an orbit of turn of the angle restrictor 212 such that the angle restrictor 212 abuts against the frame angle restrictor 95 when the opening angle of the frame member 200 is the second opening angle β. With such a configuration, in a case where the opening angle of the frame member 200 is 0° when the frame member 200 is closed, the opening angle of the frame member 200 is restricted to the range from 0° to the second opening angle β.

In this case, even in a case where the user operates the frame member 200 carelessly with the cover member 300 detached from the frame member 200, the frame member 200 is prevented from being opened at an angle exceeding the second opening angle β. Thus, the frame member 200 can be prevented from interfering with another member provided around the storage container 100.

Here, as shown in FIG. 9C, the second opening angle β is set larger than the first opening angle α of FIG. 8B which is set in regard to the door 120A. In this case, the user can open the frame member 200 more widely than the door 120A by detaching the cover member 300 from the frame member 200. Therefore, a work space for maintenance can be more largely ensured.

[6] Hinges HI

The hinge HI is preferably configured to have a so-called click mechanism that generates a holding force for holding the opening angle of the door 120A at a reference angle when the opening angle of the door 120A is the predetermined reference angle (0°, for example). In this case, the opening angle of the door 120A is held at the reference angle, so that opening or closing of the door 120A against the intension of the user is suppressed.

[7] Pipe Passage and Pipe Holder

In the liquid sending device 10 of FIG. 1, the pipes through which a mobile phase flows are respectively connected to the plurality of pump devices PP in the storage container 100. As such, a pipe passage and a pipe holder are provided in the storage container 100 according to the present embodiment.

Figure 10:
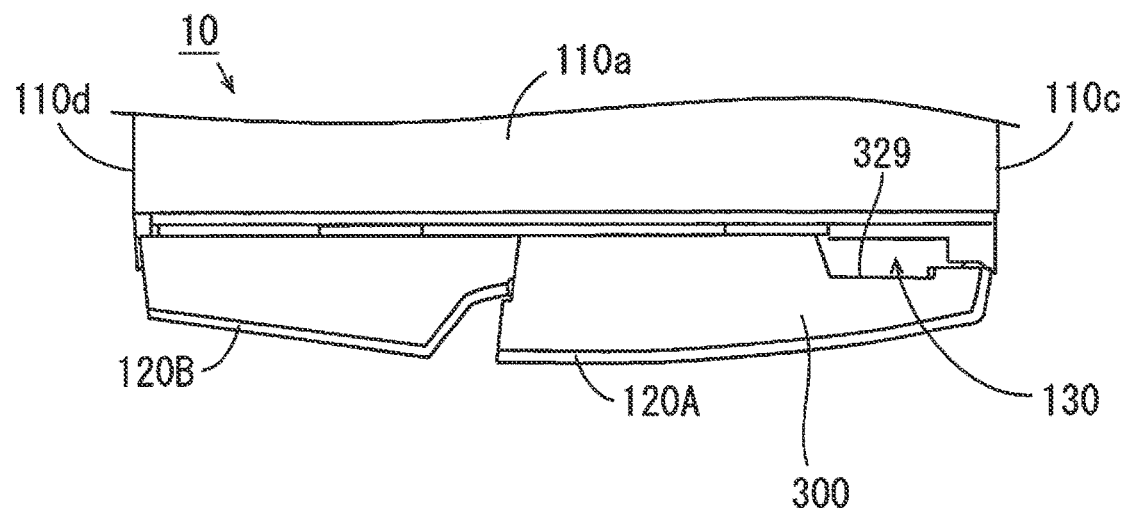
FIG. 10 is an enlarged plan view of the front portion of the liquid sending device showing a pipe passage provided in the storage container of FIG. 1.

FIG. 10 is an enlarged plan view of the front portion of the liquid sending device 10 showing the pipe passage provided in the storage container 100 of FIG. 1. FIG. 10 shows the liquid sending device 10 when the bi-parting door 120 is closed. As shown in FIG. 10, the pipe passage 130 of the present example is formed of the cutout 329 formed in the upper wall 320 (FIGS. 5A, 5B) of the cover member 300 and a front edge of the upper wall 110a of the casing 110.

With such a configuration, the pipe can be drawn out from the inside to the outside of the storage container 100 through the pipe passage 130. Further, the pipes can be drawn in from the outside to the inside of the storage container 100 through the pipe passage 130.

Figure 11:
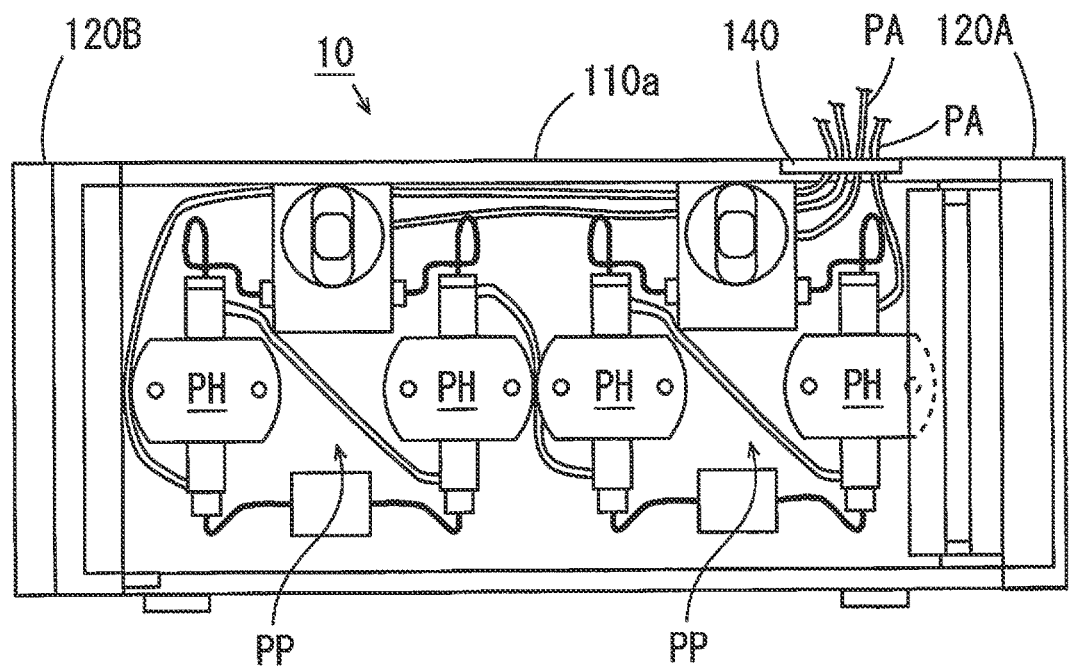
FIG. 11 is a front view of the liquid sending device showing a pipe holder provided at the storage container of FIG. 1.

FIG. 11 is a front view of the liquid sending device 10 showing the pipe holder provided in the storage container 100 of FIG. 1. FIG. 11 shows the liquid sending device 10 when the bi-parting door 120 is opened. As shown in FIG. 11, the pipe holder 140 of the present example is provided at the front edge of the upper wall 110a and configured to be capable of holding and releasing the one or plurality of pipes PA.

With such a configuration, the pipes PA connected to the pump devices PP are held by the pipe holder 140, so that a reduction in workability for maintaining the pump devices PP due to the pipes PA is suppressed.

Here, the pipe holder 140 of FIG. 11 is preferably arranged in the vicinity of the pipe passage 130 of FIG. 10 that is formed when the door 120A is closed. Further, the pipe holder 140 is more preferably arranged to overlap with the pipe passage 130 in a case where the pipe passage 130 is viewed from the outside of the storage container 100. In this case, even when the door 120A is opened, the pipes PA in the storage container 100 are held at the position of the pipe passage 130 that is formed when the door 120A is closed. Thus, when the door 120A is closed, the pipes PA are prevented from being held between the cover member 300 and the casing 110.

[8] Effects

With the above-mentioned storage container 100, the user can maintain the pump devices PP in the storage container 100 through the opening OP by opening the bi-parting door 120. Further, the user can detach the cover member 300 from the frame member 200 of the door 120A while maintaining the pump devices PP. The frame member 200 has an upper frame 220 and a lower frame 230 that are spaced apart from each other on the turning axis LA. A space is formed between the upper frame 220 and the lower frame 230. Thus, the space formed between the upper frame 220 and the lower frame 230 can be utilized as a work space for maintaining the pump devices PP. Therefore, even in a case where a pump device PP is arranged in the vicinity of the turning axis LA of the door 120A in the inner space of the casing 110, a reduction in workability for maintaining the pump device PP is suppressed.

As a result, flexibility in layout of a pump device PP to be maintained in the casing 110 is improved, and a reduction in workability for maintaining the pump device PP and an increase in size of the casing 110 can be suppressed.

Figure 12:
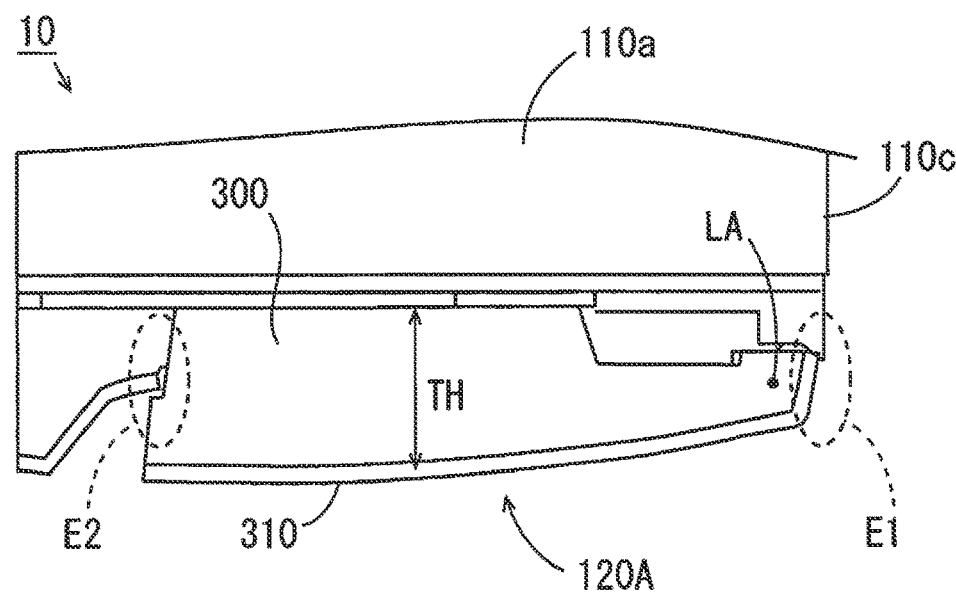
FIG. 12 is a diagram for explaining the effects obtained by the shape of the cover member of the door.

FIG. 12 is a diagram for explaining the effects obtained by the shape of the cover member 300 of the door 120A. As shown in FIG. 12, in a case where the door 120A is viewed in the direction of the turning axis LA, the cover member 300 extends in parallel with the front edge of the upper wall 110a. Here, one end and another end in the direction in which the cover member 300 extends are referred to as a first end E1 and a second end E2, respectively. The first end E1 is closer to the turning axis LA than the second end E2.

The thickness (the width of the cover member 300 in the direction perpendicular to the front edge of the upper wall 110a) TH of the cover member 300 decreases from a portion closer to the second end E2 than to the first end E1 toward the first end E1. In this case, in a case where the opening angle of the door 120A changes by a predetermined angle, a space required for the cover member 300 to turn around the turning axis LA in the vicinity of the turning axis LA is reduced. Thus, the opening angle of the door 120A can be increased while interference of the cover member 300 with another member in the vicinity of the turning axis LA is suppressed.

The thickness TH of the cover member 300 of the present example continuously decreases from a portion closer to the second end E2 than to the first end E1 toward the first end E1. The present invention is not limited to this. The thickness TH of the cover member 300 may decrease gradually from a portion closer to the second end E2 than to the first end E1 toward the first end E1. Even in this case, the same effects as the above-mentioned example can be obtained.

[9] Liquid Chromatograph

Figure 13:
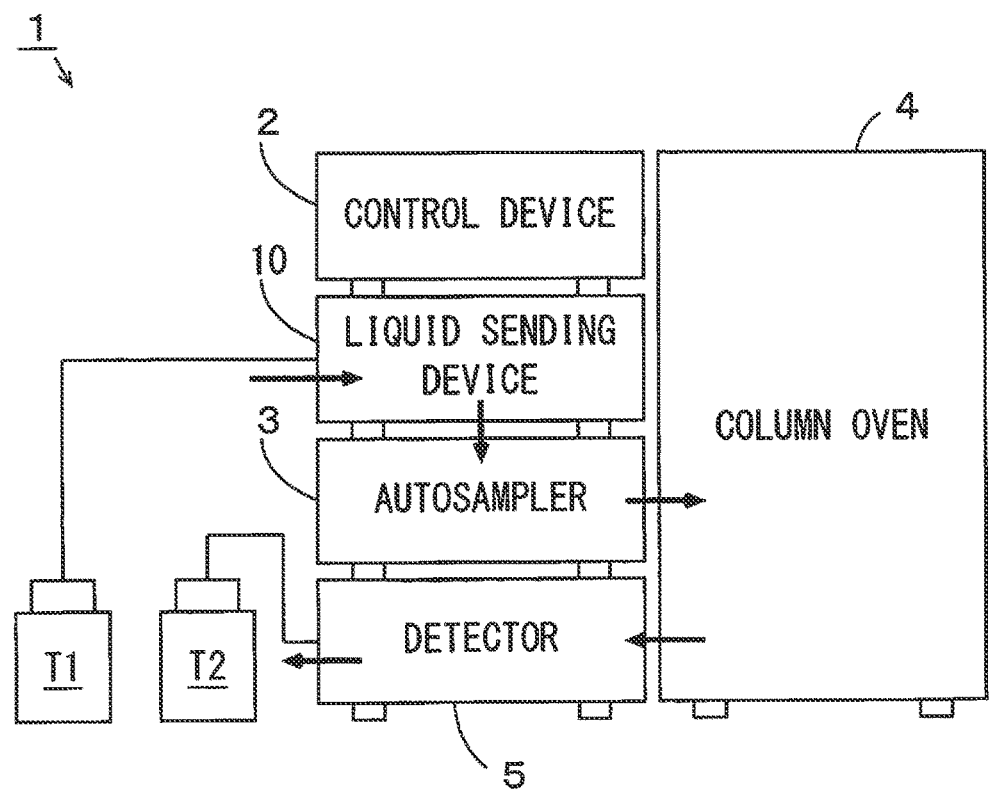
FIG. 13 is a schematic diagram showing the configuration of one example of a liquid chromatograph including the liquid sending device of FIG. 1.

FIG. 13 is a schematic diagram showing the configuration of one example of a liquid chromatograph including the liquid sending device 10 of FIG. 1. The liquid chromatograph 1 of the present example includes a control device 2, an autosampler 3, a column oven 4 and a detector 5 in addition to the liquid sending device 10 of FIG. 1.

The liquid sending device 10 supplies a mobile phase stored in a mobile phase container T1 to a column provided in the column oven 4. The autosampler 3 injects a liquid sample into the mobile phase supplied from the liquid sending device 10 to the column. The column oven 4 keeps the temperature of the column provided in the column oven 4 at a substantially constant temperature. The detector 5 detects each component of the liquid sample separated by the column. The mobile phase that has passed through the detector 5 is sent to a liquid waste container T2. The control device 2 includes a CPU and a memory, for example, and controls the operation of each element that constitutes the liquid chromatograph 1.

Here, the storage container 100 of FIG. 1 or a storage container basically having the same configuration as the storage container 100 may be applied to each of the control device 2, the autosampler 3, the column oven 4 and the detector 5. Also in this case, the same effects as the above-mentioned example in which the storage container 100 is applied to the liquid sending device 10 can be obtained.

For example, the above-mentioned detector 5 includes a flow cell as a component that needs to be replaced. Therefore, in a case where the configuration including the flow cell in the detector 5 is stored in the above-mentioned storage container 100, a reduction in workability for replacing the flow cell is suppressed by detachment of the cover member 300 from the frame member 200. Further, in this case, the arrangement of the flow cell can be defined regardless of the position of the turning axis LA. Thus, in the casing 110, flexibility in layout of the flow cell is improved, and an increase in size of the casing 110 can be suppressed.

[10] Other Embodiments (a) While the storage container 100 that is one example of the device storage structure according to the present invention is used in various devices of the liquid chromatograph in the above-mentioned embodiment, the present invention is not limited to this. Use of the above-mentioned storage container 100 is not limited to various devices of the liquid chromatograph, and the above-mentioned storage container 100 can also be used in various devices of a supercritical fluid chromatograph. Also in this case, the effects similar to the above-mentioned embodiment can be obtained.

(b) The storage container 100 may include a single opening door instead of the bi-parting door 120. In this case, the single opening door has the configuration similar to that of the above-mentioned door 120A, whereby the effects similar to those of the example of the above-mentioned embodiment can be obtained.

(c) The door 120A may be provided at the upper wall 110*a* or the lower wall 110*b* to turn around the turning axis LA in parallel with the horizontal direction.

(d) The door 120B of the above-mentioned bi-parting door 120 may have the configuration similar to that of the door 120A. In this case, a reduction in workability for maintenance in the vicinity of the turning axis LB is suppressed. Further, in the casing 110, flexibility in layout of a device is further improved, and an increase in size of the casing 110 can be more sufficiently suppressed.

(e) The upper frame 220 and the lower frame 230 of the frame member 200 may have the configuration in which the upper frame 220 and the lower frame 230 are not coupled to each other by the frame coupler 240 and are separated from each other.

(f) While the liquid sending device 10 according to the above-mentioned embodiment has the configuration in which the two pump devices PP are stored in the storage container 100, the configuration of the liquid sending device 10 is not limited to the above-mentioned example. For example, the liquid sending device 10 may have the configuration in which only one pump device PP is stored in the storage container 100. In this case, a liquid sending device 10 in which only one pump device PP is stored in a storage container 100 may be used in the liquid chromatograph 1 of FIG. 13. Alternatively, a liquid sending device in which a liquid supply device having the configuration different from that of the above-mentioned pump device PP is stored in the storage container 100 may be used in the liquid chromatograph 1 of FIG. 13. In this case, the liquid supply device may include a pump type that is different from a plunger pump such as a gear pump, a vane pump or a diaphragm pump.

[11] Correspondences between Constituent Elements in Claims and Parts in Preferred Embodiments In the following paragraphs, non-limiting examples of correspondences between various elements recited in the claims below and those described above with respect to various preferred embodiments of the present disclosure are explained.

In the above-mentioned embodiment, the structure of the storage container 100 is an example of a device storage structure for a fluid chromatograph, the door 120A is an example of a door, the turning axis LA is an example of a turning axis, the upper frame 220 or the lower frame 230 is an example of a first frame, and the lower frame 230 or the upper frame 220 is an example of a second frame.

Further, the door angle restrictor 94 and the angle restrictor 319 are examples of a first angle restrictor, the hinge attachment portion 93 and the angle restrictor 212 are examples of a second angle restrictor, the first guide grooves 221, 231 and the second guide grooves 222, 232 are examples of a guide, the pump device PP and the device provided in the autosampler 3, the column oven 4 and the detector 5 of FIG. 13 are examples of a fluid related devices.

As each of various elements recited in the claims, various other elements having configurations or functions described in the claims can be also used.

The invention claimed is:

1. A device storage structure for a fluid chromatograph, comprising:
    a casing that has an opening and stores a device to be maintained; and
    a door provided at the casing to close and open at least a partial area of the opening, wherein
    the door includes
    first and second frames that are turnable around a turning axis and spaced apart from each other on the turning axis,
    a cover member that is attachable to and detachable from the first and second frames and covers the at least a partial area when the door is closed, and
    a space is formed between the first frame and the second frame, and
    the device to be maintained includes a pump device for supplying a mobile phase to a column.

2. The device storage structure for a fluid chromatograph according to claim 1, wherein
    the door further includes a frame coupler that couples a portion of the first frame spaced apart from the turning axis to a portion of the second frame spaced apart from the turning axis.

3. The device storage structure for a fluid chromatograph according to claim 1, further comprising a first angle restrictor that restricts an opening angle of the door from exceeding a first opening angle with the cover member attached to the first and second frames.

4. The device storage structure for a fluid chromatograph according to claim 3, wherein
    a second angle restrictor that restricts an opening angle of the first frame from exceeding a second opening angle that is larger than the first opening angle with the cover member detached from the first and second frames is formed.

5. The device storage structure for a fluid chromatograph according to claim 1, wherein
    the cover member is switchable between a fixed state where the cover member is coupled to the first frame based on a predetermined positional relationship and a sliding state where the cover member is slidable with respect to the first frame, and
    the device storage structure for a fluid chromatograph further includes a guide that slidably guides the cover member in one direction, and a snap-fit mechanism that switches the cover member to the fixed state by engaging the cover member with the first frame when the cover member being slidable is put in the predetermined positional relationship with the first frame by the guide.

6. The device storage structure for a fluid chromatograph according to claim 1, further comprising first and second hinges that are provided at the casing to be located on the turning axis, wherein the first and second frames are respectively provided at the casing to be turnable around the turning axis by the first and second hinges, and the first and second hinges are configured to generate a holding force for holding an opening angle of the door at a reference angle when the opening angle of the door is the predetermined reference angle.

7. The device storage structure for a fluid chromatograph according to claim 1, wherein the cover member extends to have first and second ends, the first end is closer to the turning axis than the second end and a thickness of the cover member decreases from a portion closer to the second end toward the first end, in a case where the cover member is viewed in a direction of the turning axis.

8. A device storage structure for a fluid chromatograph, comprising:

a casing that has an opening and stores a device to be maintained; and a door provided at the casing to close and open at least a partial area of the opening, wherein the door includes first and second frames that are turnable around a turning axis and spaced apart from each other on the turning axis, a cover member that is attachable to and detachable from the first and second frames and covers the at least a partial area when the door is closed, a space is formed between the first frame and the second frame, the device to be maintained includes a fluid related device through which a mobile phase flows, a pipe that partially constitutes a flow path of the mobile phase is connected to the fluid related device, and part of the door forms a pipe passage that causes an inner space of the casing to communicate with outside of the casing when the door is closed.

9. The device storage structure for a fluid chromatograph according to claim 8, further comprising a pipe holder that holds the pipe at the casing inwardly of the door when the door is closed.

* * * * *